(12) United States Patent
Yang et al.

(10) Patent No.: US 10,501,642 B2
(45) Date of Patent: Dec. 10, 2019

(54) STABLE STAR-STRUCTURED FUNCTIONAL POLYOLEFINS

(71) Applicant: ExxonMobil Chemical Patents Inc., Baytown, TX (US)

(72) Inventors: Yong Yang, Kingwood, TX (US); Andy H. Tsou, Houston, TX (US); Kimari T. M. Slaughter, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 4 days.

(21) Appl. No.: 14/923,002

(22) Filed: Oct. 26, 2015

(65) Prior Publication Data

US 2016/0159944 A1     Jun. 9, 2016

Related U.S. Application Data

(60) Provisional application No. 62/154,340, filed on Apr. 29, 2015, provisional application No. 62/087,377, filed on Dec. 4, 2014.

(51) Int. Cl.

| | |
|---|---|
| *C08G 77/26* | (2006.01) |
| *C09D 5/08* | (2006.01) |
| *C09D 123/36* | (2006.01) |
| *C08F 8/42* | (2006.01) |
| *C08F 10/00* | (2006.01) |
| *C08G 81/00* | (2006.01) |
| *C08F 8/30* | (2006.01) |
| *B60C 1/00* | (2006.01) |
| *C08G 81/02* | (2006.01) |
| *C08G 77/48* | (2006.01) |
| *C08G 77/44* | (2006.01) |
| *C08G 77/50* | (2006.01) |
| *C08L 83/10* | (2006.01) |
| *C08G 77/54* | (2006.01) |
| *C08L 83/08* | (2006.01) |

(52) U.S. Cl.
CPC .............. *C09D 5/08* (2013.01); *B60C 1/0016* (2013.01); *C08F 8/30* (2013.01); *C08F 8/42* (2013.01); *C08F 10/00* (2013.01); *C08G 81/00* (2013.01); *C08G 81/021* (2013.01); *C09D 123/36* (2013.01); *C08G 77/26* (2013.01); *C08G 77/44* (2013.01); *C08G 77/48* (2013.01); *C08G 77/50* (2013.01); *C08G 77/54* (2013.01); *C08L 83/08* (2013.01); *C08L 83/10* (2013.01)

(58) Field of Classification Search
CPC .................................... C08L 8/10; C08L 8/08
See application file for complete search history.

(56) References Cited

U.S. PATENT DOCUMENTS

| | | | |
|---|---|---|---|
| 6,084,030 A * | 7/2000 | Janssen ............... | C08F 290/04 525/100 |
| 6,127,481 A * | 10/2000 | Janssen ............... | C08F 290/04 525/106 |
| 8,372,930 B2 | 2/2013 | Brant et al. | |
| 8,399,724 B2 | 3/2013 | Crowther et al. | |
| 8,501,894 B2 | 8/2013 | Crowther et al. | |
| 8,623,974 B2 | 1/2014 | Jiang et al. | |
| 8,669,326 B2 | 3/2014 | Hagadorn et al. | |
| 8,816,027 B2 | 8/2014 | Crowther et al. | |
| 8,835,563 B2 | 9/2014 | Crowther et al. | |
| 8,840,996 B2 | 9/2014 | Tsou et al. | |
| 8,841,394 B2 | 9/2014 | Crowther et al. | |
| 8,841,397 B2 | 9/2014 | Holtcamp et al. | |
| 8,981,029 B2 | 3/2015 | Jiang et al. | |

(Continued)

FOREIGN PATENT DOCUMENTS

| | | | |
|---|---|---|---|
| JP | 62-20558 | * | 1/1987 |
| WO | 2004/024800 | | 3/2004 |

(Continued)

OTHER PUBLICATIONS

English language abstract JP 62-20558, Jan. 1987.*
U.S. Appl. No. 61/704,611, filed Sep. 24, 2012, Kulkarini et al.
U.S. Appl. No. 61/704,725, filed Sep. 24, 2012, Crowther et al.
U.S. Appl. No. 61/860,407, filed Jul. 31, 2014, Tsou et al.
U.S. Appl. No. 61/866,702, filed Aug. 16, 2013, Blok et al.
U.S. Appl. No. 62/068,043, filed Oct. 24, 2014, Blok et al.
Gelest Inc., "Silane Coupling Agents: Connecting Across Boundaries," 2006, pp. 1-58.
Herzon et al., "Hydroaminoalkylation of Unactivated Olefins with Dialkylamines," Journal of American Chemistry Society, 2008, vol. 130, pp. 14940-14941.

(Continued)

*Primary Examiner* — Margaret G Moore

(57) ABSTRACT

Stable star-structured functional polyolefins and methods of making them, the functional polyolefins comprising a polyolefin bound at any position along its chain length to at least one nucleophile-containing silane of the following formula:

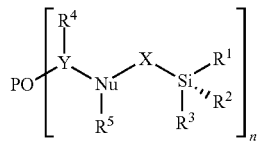

wherein Y is a di- or trivalent linker group selected from heteroatoms, C1 to C10 alkylenes, and other groups disclosed herein; Nu is a nucleophilic atom or unsaturation group; R5 is selected from hydrogen, and C1 to C10 alkyls, and other groups as disclosed herein; X is a divalent group selected from linear and branched alkylenes and heteroatom-alkylenes, and other groups as disclosed herein; and PO is a polyolefin having a weight average molecular weight of at least 400 g/mole; with the proviso that at least one of R1, R2, and R3 is selected from the same or different functional polyolefin moieties. Star-structured functional polyolefins are useful as filler dispersive additives in tire formulations and processing aids.

24 Claims, 5 Drawing Sheets

(56) References Cited

U.S. PATENT DOCUMENTS

| | | |
|---|---|---|
| 2011/0178233 A1 | 7/2011 | Chaboche et al. |
| 2012/0283346 A1* | 11/2012 | Backer .................. C08F 255/02 521/134 |
| 2013/0197180 A1 | 8/2013 | Crowther et al. |
| 2013/0296471 A1 | 11/2013 | Lesage et al. |
| 2013/0310528 A1 | 11/2013 | Crowther et al. |
| 2014/0088213 A1* | 3/2014 | Kulkarni .................. C08F 8/42 521/134 |
| 2014/0088264 A1 | 3/2014 | Crowther et al. |
| 2014/0275433 A1 | 9/2014 | Ng et al. |

FOREIGN PATENT DOCUMENTS

| | | |
|---|---|---|
| WO | 2009/155471 | 12/2009 |
| WO | 2009/155472 | 12/2009 |
| WO | 2009/155510 | 12/2009 |
| WO | 2009/155517 | 12/2009 |
| WO | 2012/134716 | 10/2012 |
| WO | 2012/134717 | 10/2012 |
| WO | 2013/041151 | 3/2013 |
| WO | 2014/052200 | 4/2014 |
| WO | 2015/023382 | 2/2015 |

OTHER PUBLICATIONS

Matoishi et al., "Preparation and Characteristics of Well-defined Polyethylene/Poly(ethylene glycol) Hybrid Materials of Different Molecular Architectures," Chemistry Letters, 2010, vol. 39, pp. 1028-1029.

Matoishi et al., "*Value-added olefin-based materials originating from FI catalysis: Production of vinyl—and Al—terminated PEs, end-functionalized PEs, and PE/polyethylene glycol hybrid materials*," Catalysis Today, 2011, vol. 164, pp. 2-8.

* cited by examiner

STABLE STAR-STRUCTURED FUNCTIONAL POLYOLEFINS

CROSS-REFERENCE TO RELATED APPLICATIONS

This present application claims priority to U.S. Ser. No. 62/154,340, filed Apr. 29, 2015; also, the present application is related to U.S. Ser. No. 62/087,377, filed Dec. 4, 2014.

FIELD OF THE INVENTION

The present invention relates to branched functional polyolefins and to methods of obtaining such polyolefins.

BACKGROUND OF THE INVENTION

Functional polyolefins with high reactivity and high stability for various multi-component formulations such as composites, adhesives, and tires are always challenging. Functional polyolefins with complex architectures are critical in performance enhancement and rheological properties for some applications, which adds another layer of difficulty in efficient and economic synthesis/process. Such functional polymers have a particularly desirable use in dispersing agents for inorganic particles within polymer matrices, and as processing agents for difficult to process polymers.

It is desirable to add fillers to polymer compositions to improve properties such as heat distortion temperatures, dimensional stability, and stiffness. However, this presents some problems. First, many fillers are not compatible with polymers, especially polyolefin polymers which tend to be highly non-polar. A further problem is that there is an increasing desire to use nanoparticles (less than 0.1 μm in one dimension) to improve the performance of thin films and micro and nano-fibers made from polyolefins. Such nanoparticles have very high surface areas so they disperse even more poorly than larger particles.

Dispersing polar nanofillers in non-polar polyolefins has always been challenging. Despite the theoretical promises of having a polyolefin nanocomposite with nano-dispersed silica clusters for enhancements in mechanical stiffness, strength, rheological melt strength, shear thinning, and in thermal heat distortion resistance, there are currently no polyolefin-silica nanocomposites commercially available. Prior disclosures have demonstrated that polyolefins can form structures with aminosilanes for improved silica dispersion in polymer blends, and for forming hydrophilic compositions for such applications as corrosion resistant coatings. What is needed is a way to thoroughly disperse polar nanoparticles such as silica into a polyolefin (e.g., polyethylene and/or polypropylene) matrix. In particular, what is needed is a method to effect or "control" condensation by aminosilane species to form complex hydrophilic-hydrophobic materials. The present invention(s) is directed to such an end.

Related disclosures include U.S. Pat. Nos. 8,840,996; 8,669,326; 8,816,027; 8,623,974; US 2014/088264; US 2014/275433; U.S. Pat. No. 8,372,930; US 2013/0197180; U.S. Pat. Nos. 8,835,563; 8,501,894; US 2011/0178233; US 2013/0296471; WO 2004/024800; WO 2013/041151; WO 2015/023382; WO 2009/155517; WO 2009/155510; WO 2009/155471; WO 2009/155472; WO 2014/052200; WO 2012/134717; Gelest Inc., "Silane Coupling Agents: Connecting Across Boundaries" (2006); and S. B. Herzon et al., "Hydroaminoalkylation of Unactivated Olefins with Dialkylamines," in 130, J. AM. CHEM. SOC., pp. 14940-14941 (2008).

SUMMARY OF THE INVENTION

Disclosed are stable star-structured functional polyolefins comprising a polyolefin bound at any position along its chain length to at least one nucleophile-containing silane of the following formula:

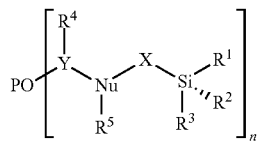

wherein:

"Y" is a di- or trivalent linker group selected from heteroatoms, $C_1$ to $C_{10}$ alkylenes, heteroatom substituted $C_1$ to $C_{10}$ alkylenes, $C_6$ to $C_{20}$ arylenes, and heteroatom substituted $C_6$ to $C_{20}$ arylenes; $R^4$ is selected from hydrogen, heteroatoms, and $C_1$ to $C_{10}$ alkyls;

"Nu" is a nucleophilic atom or unsaturation group; preferably nitrogen, oxygen, sulfur, or phosphorous;

$R^5$ is selected from hydrogen, and $C_1$ to $C_{10}$ alkyls, $C_1$ to $C_{10}$ aminoalkyls, $C_6$ to $C_{20}$ aryls, $C_7$ to $C_{22}$ alkylaryls, and $C_7$ to $C_{22}$ arylalkyls;

"X" is at least a divalent group selected from heteroatoms, $C_1$ to $C_{20}$ linear alkylenes, a $C_2$ to $C_{22}$ aminoalkylenes, $C_2$ to $C_{22}$ divalent ethers, and $C_2$ to $C_{22}$ or $C_{40}$ branched alkylene;

at least one silane group wherein each $R^1$, $R^2$, and $R^3$ are independently selected from hydrogen, hydroxide, $C_1$ to $C_{10}$ alkoxys, $C_6$ to $C_{30}$ aryloxys, $C_7$ to $C_{30}$ arylalkyloxys, and $C_1$ to $C_{10}$ alkylamines, wherein any 2- or more groups can form an aliphatic or aromatic cyclic structure that includes the silicon atom; and "PO" is a polyolefin having a weight average molecular weight ("Mw") of at least 400 g/mole; and "n" is an integer within the range from 1, or 2, or 5 to 10, or 20, or 30;

with the proviso that at least one of $R^1$, $R^2$, and $R^3$ is selected from "functional polyolefin moieties" having the following structure:

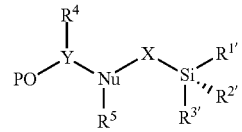

wherein, the functional polyolefin moiety is covalently bonded through any one or more of $R^{1'}$, $R^{2'}$, or $R^{3'}$; and where any other one or more of $R^{1'}$, $R^{2'}$, or $R^{3'}$ is independently selected from hydroxide, $C_1$ to $C_{10}$ alkoxys, $C_6$ to $C_{30}$ aryloxys, $C_7$ to $C_{30}$ arylalkyloxys, and $C_1$ to $C_{10}$ alkylamines, wherein any 2- or more groups can form an aliphatic or aromatic cyclic structure that includes the silicon atom functional polyolefin moieties.

Also disclosed is a method of forming stable star-structured functional polyolefins comprising combining at least one polyolefin with at least one nucleophile-reactive group or unsaturation at one or both of the chain ends and/or inside the chain; and at least one nucleophile-containing silane; preferably an aminosilane to form a functional polyolefin; wherein the at least one site of unsaturation or nucleophile-reactive group forms a covalent bond with the nucleophilic atom of the nucleophile-containing silane, and effecting condensation between functional polyolefins to form star-structured functional polyolefins having a branching number of at least 2.

DETAILED DESCRIPTION OF THE INVENTION

Figure 1:
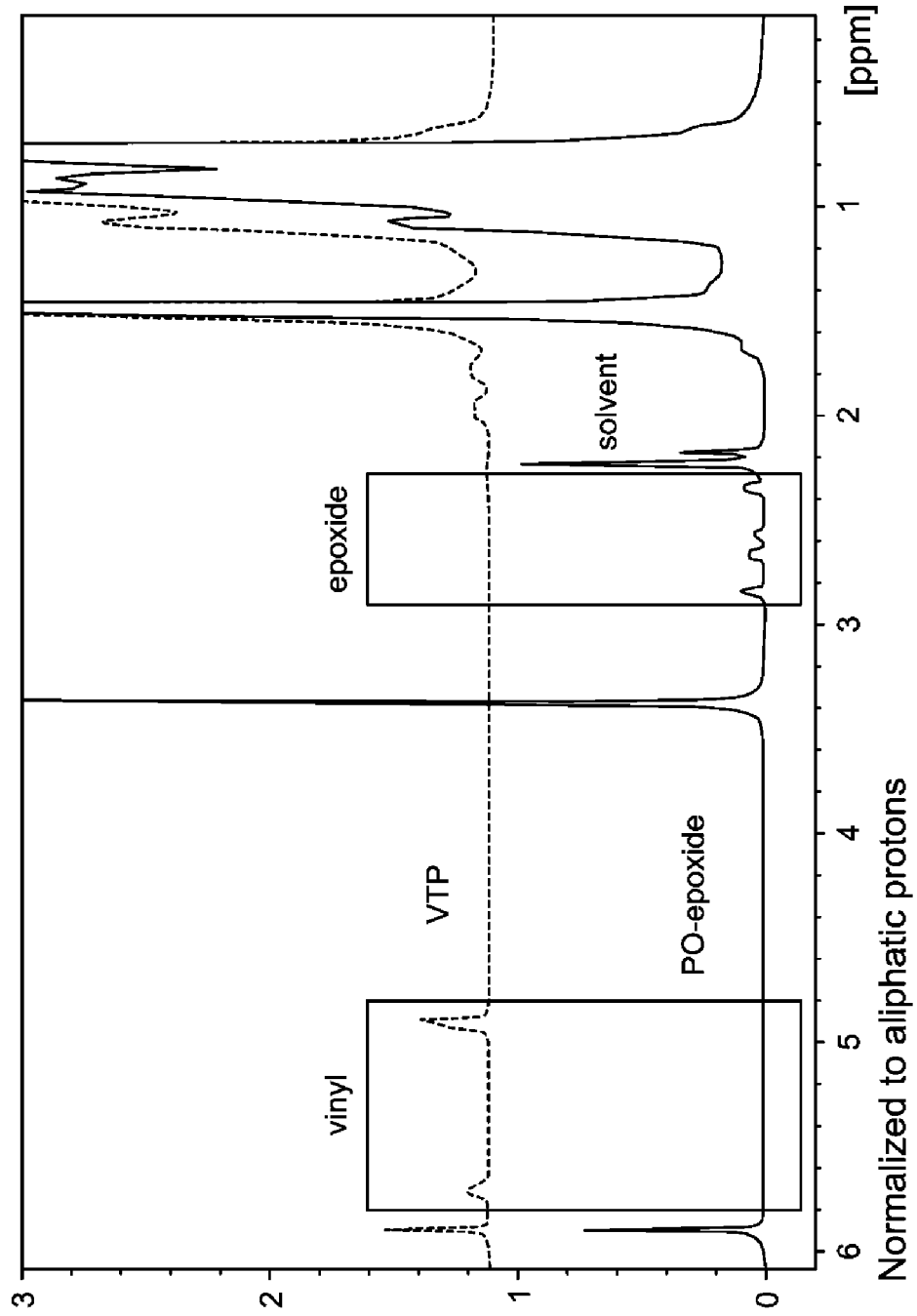
FIG. 1 are overlay of $^1$H NMR Spectra of vinyl/vinylidene terminated polyolefin ("VTP") (top) and PO-Epoxide (bottom).

The new synthetic method disclosed herein involves the introduction of at least one silane functionality onto a polyolefin backbone, preferably at least at the chain end. During the silane functionalization step, an in-situ self-condensation occurs simultaneously, giving rise to moderately to highly complex branched structures as well as the functionality. The "one-pot" tandem functionalization and condensation synthetic step is efficient and economic. The complexity and degree of condensation can be determined by the silane species involved, most of which are commercially available. The resulting silane-functionalized polyolefins ("star-structured functional polyolefins") are stable at elevated temperatures over extended time periods, demonstrated by the relatively constant molecular weights in comparison to the non-functionalized polyolefins. The attached silane functionality, as well as the stable structure, enable the polyolefins to be applied in various formulations and products in which one or more components are typically incompatible with polyolefins. The new synthesis allows facile and efficient functionalization and construction of complex architecture at the same time with good control through rational substrate choice, leading to new easy-processing (long-chain branched) polyolefin coupling agents for fillers, uniquely suited to improve filler dispersion without compromising processability.

The functionalization of the polyolefin can be started with any polyolefin with unsaturations in the backbone or nucleophile-reactive site, preferably at a pendant group or chain end. Suitable polyolefins include, but are not limited to, polybutadienes and polyisoprenes, either in homopolymer or copolymer forms, ethylene-propylene-diene terpolymers, and preferably vinyl/vinylidene-terminated polyolefins. In these cases, the unsaturation may be converted to epoxide in one preferred reaction pathway, which subsequently reacts with a nucleophile (e.g., amine) as part of a silane agent, typically with an alkoxysilane. The alkoxysilane (or silanol) is able to condense, and the condensation degree can be tuned by conditions such as temperature, pH, and most particularly the chemical/steric nature of the adjacent amine group, during reaction or workup process.

Various functionalized polyolefins produced and disclosed herein were subjected to accelerated oven aging testing, in which aliquots are taken out in certain time intervals and subjected to gel permeation chromatography (GPC) analysis. The GPC results reveal the aminosilane-functionalized polyolefins have higher molecular weight and lower branching index than their precursors, and the molecular weights are relatively constant over the time periods.

Star-Structured Functional Polyolefins

Thus, in any embodiment the invention includes a star-structured functional polyolefins comprising a polyolefin bound at any position along its chain length to at least one nucleophile-containing silane of the following formula (1):

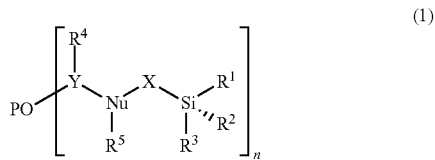

wherein:
"Y" is a di- or trivalent linker group selected from heteroatoms, $C_1$ to $C_{10}$ alkylenes, heteroatom substituted $C_1$ to $C_{10}$ alkylenes, $C_6$ to $C_{20}$ arylenes, and heteroatom substituted $C_6$ to $C_{20}$ arylenes; $R^4$ is selected from hydrogen, heteroatoms, and $C_1$ to $C_{10}$ alkyls; most preferably $R^4$ is hydroxyl or hydrogen;

"Nu" is a nucleophilic atom or unsaturation group; preferably nitrogen, oxygen, sulfur, or phosphorous; and most preferably Nu is nitrogen;

$R^5$ is selected from hydrogen, and $C_1$ to $C_{10}$ alkyls, $C_1$ to $C_{10}$ aminoalkyls, $C_6$ to $C_{20}$ aryls, $C_7$ to $C_{22}$ alkylaryls, $C_7$ to $C_{22}$ aminoaryls, and $C_7$ to $C_{22}$ arylalkyls;

"X" is at least a divalent group selected from heteroatoms, $C_1$ to $C_{20}$ linear alkylenes, a $C_2$ to $C_{22}$ aminoalkylenes, $C_2$ to $C_{22}$ divalent ethers, and $C_2$ to $C_{22}$ or $C_{40}$ branched alkylene; preferably wherein X is a $C_1$ to $C_{20}$ linear alkylene, or a $C_1$ to $C_{40}$ branched alkylene; most preferably X is a divalent $C_2$ to $C_{20}$ linear or branched alkylene;

at least one silane group (depending on the valency of "X") wherein each $R^1$, $R^2$, and $R^3$ are independently selected from hydrogen, hydroxide, $C_1$ to $C_{10}$ alkoxys, $C_6$ to $C_{30}$ aryloxys, $C_7$ to $C_{30}$ arylalkyloxys, and $C_1$ to $C_{10}$ alkylamines, wherein any 2- or more groups can form an aliphatic or aromatic cyclic structure that includes the silicon atom; preferably each $R^1$, $R^2$, and $R^3$ are independently selected from hydrogen and $C_1$ to $C_5$ alkoxys; and "PO" is a polyolefin having a Mw of at least 400 g/mole; and "n" is an integer within the range from 1, or 2, or 5 to 10, or 20, or 30;

with the proviso that at least one of $R^1$, $R^2$, and $R^3$ is selected from functional polyolefin moieties having the following structure (2):

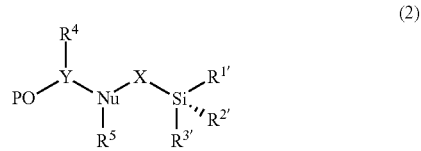

wherein the functional polyolefin moiety is covalently bonded through any one or more of $R^{1'}$, $R^{2'}$, or $R^{3'}$; and where any other one or more of $R^{1'}$, $R^{2'}$, or $R^{3'}$ is independently selected from hydroxide, $C_1$ to $C_{10}$ alkoxys, $C_6$ to $C_{30}$ aryloxys, $C_7$ to $C_{30}$ arylalkyloxys, and $C_1$ to $C_{10}$ alkylamines, wherein any 2- or more groups can form an aliphatic or aromatic cyclic structure that includes the silicon atom functional polyolefin moieties. Most preferably, at least one of $R^{1'}$, $R^{2'}$, or $R^{3'}$ is selected from functional polyolefin moieties.

By "stable" what is meant is that the structures' molecular weight does not decrease as measured by GPC by more than 15% when exposed to a temperature of at least 100° C. for 48 hours, preferably in its "neat" or undiluted form. Most preferably, the weight loss (decrease in the Mw) after one week at 120° C. of the star-structured functional polyolefins is less than 5, or 10, or 15% of its original Mw.

By "valency of X", what would readily be understood by those of skill in the art is that, for instance, if "X" were an oxygen group, there could only be one silane group, where if "X" were a carbon-based group, there could be one, two, or three silanes bound thereto, but preferably there is only one.

In any embodiment, the polyolefin "PO" bound to at least one nucleophile-containing silane anywhere along the polyolefin chain is selected from the group consisting of polybutadienes, polyisoprenes, isobutylene-isoprene copolymer, halogenated isobutylene-isoprene copolymer, isobutylene-p-methylstyrene copolymer, halogenated isobutylene-p-methylstyrene copolymer, ethylene-propylene-diene terpolymers, vinyl/vinylidene-terminated polypropylenes (atactic or isotactic), vinyl/vinylidene-terminated polyethylenes, and vinyl/vinylidene-terminated ethylene-propylene copolymers. The "halogenated isobutylene-p-methylstyrene copolymer" is an example of a PO in which the reactive group is the halogenated (e.g., brominated) center and not an unsaturation. Many other such POs can be envisioned by those of skill in the art that would be useful in the invention herein. It is understood that the "PO" has an open valency in at least one position (the position along the chain involved in bonding to the silane) such that it is covalently bound to the nucleophile-containing silane, preferably at the "Nu" group of the silane. Thus, the silane is desirably intact in at least one position along the PO, preferably 2, or 3, or 4 or more up to 20, or 30 positions along the chain, preferably at least at a terminal position of the PO. This is the case in particular for vinyl/vinylidene-terminated polyolefins.

Vinyl/Vinylidene-Terminated Polyolefins

The vinyl/vinylidene-terminated polyolefins ("VTP") useful in the inventive star-structured functional polyolefins described herein can be made in any number of ways. By "vinyl/vinylidene", what is meant is that the polyolefin may be a mixture of both vinyl- and vinylidene-terminated polyolefins (or, more generally, "allylic" chain ends), or the polyolefin may be substantially all one form or the other. Preferably, the VTP's useful herein are polymers as first described in U.S. Pat. No. 8,372,930 having at least one terminus ($CH_2$=$CHCH_2$— oligomer or polymer) represented by formula (3):

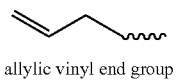

(3)

allylic vinyl end group where the "⁓⁓" here represents the "PO" portion of the inventive functionalized polyolefins. In a preferred embodiment the allyl chain ends are represented by the formula (4):

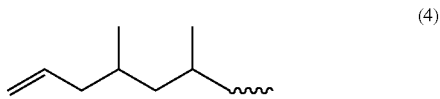

(4)

The amount of allyl chain ends is determined using $^1$H NMR at 120° C. using deuterated tetrachloroethane as the solvent on a 500 MHz machine, and in selected cases confirmed by $^{13}$C NMR. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated polyolefins in Resconi et. al, 114, J. AM. CHEM. SOC., 1025-1032 (1992), that are useful herein.

The vinyl/vinylidene-terminated propylene-based polymers may also contain an isobutyl chain end at the end opposite the allyl group. "Isobutyl chain end" is defined to be an oligomer having at least one terminus represented by the formula (5):

(5)

In a preferred embodiment, the isobutyl chain end is represented by one of the following formulae (6):

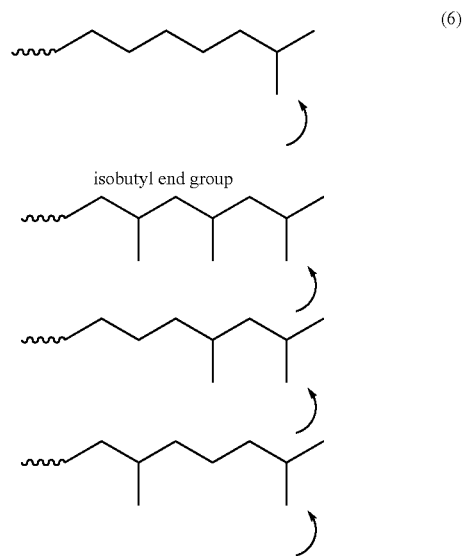

(6)

isobutyl end group

The percentage of isobutyl end groups can be determined using $^{13}$C NMR (as described in the example section) and the chemical shift assignments in Resconi for 100% propylene oligomers. Preferably, the vinyl/vinylidene-terminated polymers described herein have an allylic terminus, and at the opposite end of the polymer an isobutyl terminus.

The VTPs can be made by any suitable means, but most preferably the VTPs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 250 Å$^3$) perfluorinated boron activator such as Dimethylaniliniumtetrakis(perfluoronaphthyl) borate, for example, as described in WO 2015/009474, U.S. Pat. Nos. 8,841,397 and 8,623,974.

The vinyl/vinylidene-terminated polyolefin (and the corresponding "PO" group) can be any polyolefin having a vinyl/vinylidene-terminal group, and is preferably selected from the group consisting of vinyl/vinylidene-terminated isotactic polypropylenes, atactic polypropylenes, syndiotactic polypropylenes, polyethylenes, propylene-butene copolymers, propylene-hexene copolymers, and propylene-ethylene copolymers (wherein the copolymers may be random, elastomeric, impact and/or block), and combinations thereof, each having a number-average molecular weight (Mn) of at least 200 g/mole. In any embodiments, the VTP may be a copolymer wherein the $C_2$ content (ethylene derived units) of the vinyl/vinylidene-terminated polyolefin is from 3 to 50 wt %, and the $C_3$ content (propylene derived units) is from 50 to 97 wt %. In yet another embodiment, the VTP may contain a third comonomer, and in these cases, the $C_4$ through $C_{14}$ content (units derived from $C_4$ to $C_{14}$ α-olefins or dienes) is from 5 to 30 wt % in those embodiments, while the $C_2$ content is from 5 to 50 wt % and the $C_3$ content is from 20 to 90 wt %.

In any embodiment, greater than 70, or 80, or 90, or 94, or 96% of the VTP comprises terminal vinyl and/or vinylidene groups; or within the range of from 50, or 60 wt % to 70, or 80, or 90, or 95, or 98 or 99%. The vinyl/vinylidene-terminated polyolefins preferably have a number average molecular weight (Mn) value of at least 200, or 400, or 600, or 1000, or 5000, or 20,000 g/mole, or within the range of from 200, or 400, or 600, or 1,000, or 5,000, or 10,000, or 20,000 g/mole to 20,000, or 30,000, or 40,000, or 50,000, or 100,000 g/mole. The vinyl/vinylidene-terminated polyolefins preferably have a weight-average molecular weight (Mw) value of at least 400, or 500, or 1,000, or 2000 g/mole, or preferably within the range from 400, or 400, or 1,000, or 2,000, or 4,000, or 5,000, or 10,000 g/mole to 25,000, or 30,000, or 40,000, or 50,000, or 100,000, or 200,000, or 250,000 g/mole. The VTPs most useful herein have a molecular weight distribution (Mw/Mn) of less than 3.0 or 4.0 or 5.0, or within a range of from 1.8, or 2.0 to 3.0, or 4.0, or 5.0. Preferably, the VTP useful herein is amorphous polypropylene, and desirably has a glass transition temperature (Tg) of less than 10 or 5 or 0° C., more preferably less than 0, or −5, or −10° C.; or within the range of from 0, or −5, or −10° C. to −30, or −40, or −50° C. or as described herein.

The VTPs are preferably linear, meaning that there is no polymeric or oligomeric branching from the polymer backbone, or described quantitatively, having a branching index "g" (or g'$_{(vis\ avg)}$) of at least 0.90 or 0.96 or 0.97 or 0.98, wherein the "branching index" is measured and determined as in U.S. Pat. No. 7,807,769.

A particularly preferred VTP is one wherein the vinyl terminated polyolefin is a compound or mixture of compounds represented by the formula (7):

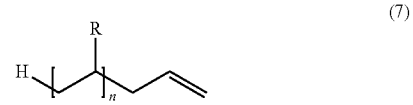

(7)

wherein each "R" is selected from hydrogen and C1 to C4 or C10 alkyls, preferably hydrogen or methyl, or a mixture thereof; and n is an integer from 20, or 40 to 100, or 200, or 500, or 800, or 1000, or 1500, or 2000. It is these VTPs that are reacted, under suitable conditions, with a functionalizing agent to form the functionalized polyolefins which can react with the nucleophile containing silanes, or form an intermediate reactive group such as a glycol as described herein (through epoxidation or hydrosilylation, for example) to form star-structured functionalized polyolefins.

Thus, this formed start-structured functional polyolefin can be combined with other components such as another polyolefin to be used as a processing aid, or can be combined with elastomers, curatives, fillers and other agents common in the tire tread industry and used for forming tire treads.

Method of Forming the Star-Structured Functional Polyolefins

The invention described herein also includes a method of forming the star-structured functional polyolefins comprising combining at least one polyolefin comprising at least one nucleophile-reactive group or unsaturation at one or both of the chain ends and/or inside the chain; and at least one "nucleophile-containing silane", preferably an aminosilane, to form a functionalized polyolefin (e.g., PO-aminosilane); wherein the at least one site of unsaturation or nucleophile-reactive group forms a covalent bond with the nucleophilic atom of the nucleophile-containing silane. Finally, condensation between functional polyolefins is effected, such as by continued heating in solvent (refluxing, such as in xylene, toluene and/or benzene) for at least 2 hours, or within a range from 2, or 4 hours to 10, or 20, or 30 hours. In this manner, branching of the polyolefins is accomplished where the functional polyolefins bond together though the silanes (carbon-silicon-carbon or oxygen-silicon-oxygen) linkages, thus forming star-structured functional polyolefins having a branching number of at least 2. The occurrence and nature of the condensation is largely influenced by the structure of the aminosilane used to make the functionalized polyolefin. One of the major effects is the linkage between nucleophile portion (e.g., nitrogen) and silicon—certain lengths and structures that favor cyclic formation, facilitating zwitterion intermediate, stabilizing monomeric silane species, and causing less condensation, while certain lengths and structures don't have such effect, causing more condensation.

In any embodiment, the "nucleophile-containing silane" is selected from compounds having the following structure (8):

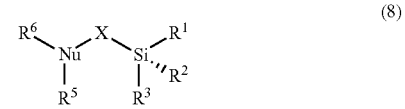

(8)

wherein each R$^1$, R$^2$, and R$^3$ are independently selected from hydrogen, hydroxide, C1 to C10 alkoxys, C$_6$ to C$_{30}$ aryloxys, C$_7$ to C$_{30}$ arylalkyloxys, and C$_1$ to C$_{10}$ alkylamines, wherein any 2- or more groups can form an aliphatic or aromatic cyclic structure with that includes the silicon atom; or as preferably described elsewhere herein;

"Nu" is a nucleophilic atom or unsaturation group; preferably nitrogen, oxygen, sulfur, or phosphorous; or as preferably described elsewhere herein;

"X" is a divalent group selected from heteroatoms, $C_1$ to $C_{20}$ linear alkylene, a $C_2$ to $C_{22}$ aminoalkylene, $C_2$ to $C_{22}$ divalent ether, and $C_2$ to $C_{22}$ or $C_{40}$ branched alkylene; or as preferably described elsewhere herein;

R5 and R6 are independently selected from hydrogen, $C_1$ to $C_{10}$ alkyls, $C_1$ to $C_{10}$ aminoalkyls (e.g., ethylene diamines, tetramethylenediamines, etc.), $C_6$ to $C_{20}$ aryls, $C_7$ to $C_{22}$ alkylaryls, $C_7$ to $C_{22}$ aminoaryls (e.g., aniline), and $C_7$ to $C_{22}$ arylalkyls, and either R5 or $R^6$ can optionally be another silane group as below; and at least one silane group (depending on the valency of X) wherein any one of $R^1$, $R^2$ or $R^3$ may form a 5 to 10 membered alkylene or aminoalkylene ring with Nu, or as preferably described elsewhere herein.

In a preferred embodiment, the "nucleophile-containing silane" is selected from aminosilane compounds having the following structure (9):

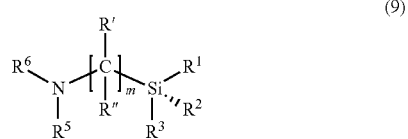

wherein $R^1$ to $R^6$ have the meanings as defined above, m is an integer within the range from 1, or 2 to 5, or 8, or 10, and each of R' and R" are independently selected from hydrogen and C1 to C5 alkyls; most preferably each of R' and R" are either hydrogen or methyl groups. The structures resulting in the reaction between the aminosilanes and VTPs are the functional polyolefins (e.g., "PO-aminosilanes"), and the condensation product of this are the star-structured functional polyolefins (e.g., "star structured PO-aminosilanes").

In any case, the components that go into forming the star-structured functional polyolefin can be combined in any number of ways to effect the formation of a covalent bond between the nucleophile-containing silane and the functionalized polyolefin. In any embodiment, the combining occurs under hydroaminoalkylation conditions (A), where the VTP labeled as (7) reacts with the nucleophile-containing silane (8) to form the PO-aminosilane. Also in any embodiment the pathway (B) may be used where a VTP (7) with at least one unsaturation is treated first with a functionalizing agent ("FA"), prior to combining with the at least one nucleophile-containing silane, by one or more of direct epoxidation, and/or hydrosilylation. These schemes are depicted generally here:

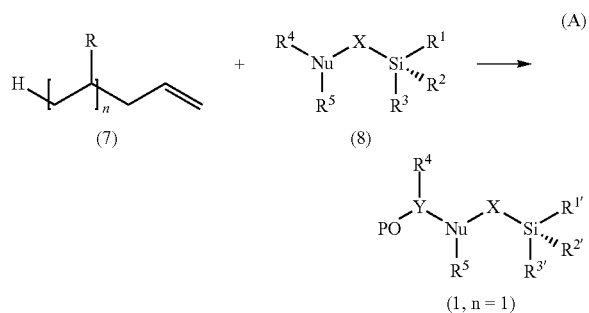

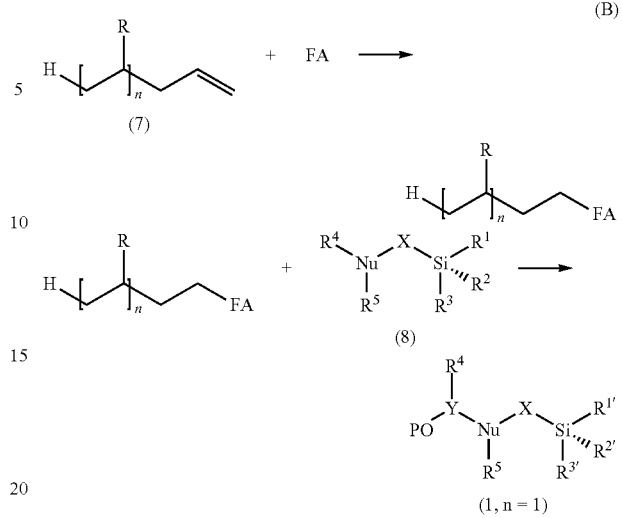

Thus, for instance, under hydroaminoalkylation conditions to effect (A), the reaction would typically be carried out in non-polar, aprotic medium, preferably xylenes, toluene, and/or benzene by combining the desired aminosilane, for example, with the VTP at a temperature within the range from 120, or 130, or 140° C. to 170, or 180, or 190° C. More desirably, a catalyst can be used that would allow a lower temperature, such as an Group 4 to 6 amino catalyst, for example, a halotantalum amide catalyst or niobium binaphtholate, or compounds such as Zr, Hf, or $Ti(NR_2)_4$, where "R" can me methyl, ethyl, propyl, or benzyl groups. It is then cooled down to room temperature and precipitated in a polar solvent such as isopropanol. In any case, after reacting for 2 to 24 or 26 or 48 hours, the product is recovered by filtration and dried at about 60° C. in a vacuum oven until the weight is constant.

In scheme (B), when the nucleophile is a nitrogen or nitrogen containing group (such as in structure (9)), it may react with a glycol group or some other moiety that is capable of forming a covalent bond with the nitrogen, such glycol group either already part of the PO ("FA" in scheme (B) above), or simultaneously combined therewith. In any embodiment, the method further comprises a step of exposing the reaction product of the initial "combining" step to in situ condensation. More specifically, the reaction it typically carried out under nitrogen protection, where the PO-epoxide is dissolved in appropriate amount of non-polar, aprotic medium (e.g., toluene or xylene) in a flask equipped with a condenser, followed by addition of appropriate amount of aminosilane and magnesium bromide ethyl etherate. The reaction mixture is then stirred under room temperature (23° C.) to refluxing temperature for 2 to 12 hours. It is then cooled down to room temperature and precipitated in a polar solvent such as isopropanol. The product is recovered by filtration and dried at about 60° C. in a vacuum oven until the weight is constant.

Thus in any embodiment, all two and/or three steps, preferably the step of combining the functionalized polyolefin with the nucleophile containing silane followed by condensation, occur together in one system or reaction unit—or "one pot"—such that there is no separate reaction steps and isolation of intermediate products.

As mentioned, in any embodiment the polyolefin with at least one nucleophile-reactive group or unsaturation is selected from the group consisting of polybutadienes, polyisoprenes, isobutylene-isoprene copolymer, halogenated isobutylene-isoprene copolymer, isobutylene-p-methylstyrene copolymer, halogenated isobutylene-p-methylstyrene copolymer, ethylene-propylene-diene terpolymers, vinyl/vinylidene-terminated polypropylenes (atactic or isotactic), vinyl/vinylidene-terminated polyethylenes, and vinyl/vinylidene-terminated ethylene-propylene copolymers.

In any case, the number of PO groups associated with one structure (1), or the "branching number", can be systematically tailored to suit the needs of the end user, such as within the range from 2, or 3, or 4, or 6, or 8 to 15, or 20, or 30. In this regard, also disclosed herein is a method of tailoring the branching number of a silane-functionalized polyolefin, wherein the at least one nucleophile-containing silane is chosen to favor the zwitterion at one extreme, or cyclic intermediate at the other extreme by varying the reaction temperature, the pH of the medium, the identity of "X", R5, or any combination thereof. Most preferably, the "X" group can be varied to be an alkylene selected from C3 to C10 linear alkylenes, C4 to C11 branched alkylenes (e.g., methyl branches along an alkylene-chain), C3 to C10 linear aminoalkylenes, and C4 to C11 branched aminoalkylenes. Also, R5 in structure (1) can preferably be varied to be a hydrogen, or C1 to C5 alkyl groups. Most preferably, as the tendency to form an amino-silane zwitterion increases, the branching number decreases. As mentioned, and can be seen herein, this can be systematically effectuated. In any embodiment, for example, X is a C3 and below linear alkylene thus favoring less branching, preferably a branching number of 7 and below; or in another example X is a branched, most preferably geminally substituted C4 alkylene and above thus favoring more branching, preferably a branching number of 8 and above.

For example, a highly processable polyolefin blend can be made comprising a polyolefin and within the range from 0.1, or 0.5 wt % to 5, or 10, or 20 wt % of at least one star-structured functional polyolefin, based on the weight of the blend, as described above. Preferably, the star-structured functional polyolefins here can have a branching number (number of PO groups associated in one structure (1)) of at least 3, or within a range from 3, or 8, or 11 to 15, or 20, or 30.

As another example, a tire tread formulation can be made comprising the star-structured functional polyolefins, preferably comprising at least one elastomer, silica, and the star-structured functional polyolefins. Preferably, the star-structured functional polyolefins in this case can have a branching number of at least 2, or within a range from 2 to 5, or 10.

The various descriptive elements and numerical ranges disclosed herein for the inventive star-structured functional polyolefins and methods of forming such can be combined with other descriptive elements and numerical ranges to describe the invention(s); further, for a given element, any upper numerical limit can be combined with any lower numerical limit described herein, including the examples in jurisdictions that allow such ranges. The features of the inventions are demonstrated in the following non-limiting examples.

EXAMPLES

Test Methods
Branching. The inventive block copolymers herein are highly branched and thus, quantifying the branching must take into account some factors. The calculated $g'_{vis\ avg}$ values (or simply g') herein can be determined as described in US 2013/0090433.

Molecular Weights. Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). In particular, a triple-detector GPC was used herein, which has both DIR and MALLS, but the MALLS Mw were extracted for stability studies. The y-axis of the figure state "Mw (HT-GPC-3D-TCB LS)", which means "weight-averaged molecular weight (high-temperature GPC, triple-detector, TCB solvent, from Light Scattering detector)". Three Polymer Laboratories PLgel 10 mm Mixed-B columns are used. The nominal flow rate is 0.5 cm³/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 µm glass pre-filter and subsequently through a 0.1 µm Teflon filter. The TCB is then degassed with an online degasser before entering the SEC.

Synthesis of Vinyl/Vinylidene Terminated Polyolefins

As an example of a polyolefin with at least one nucleophile-reactive group or unsaturation at one or both of the chain ends, vinyl/vinylidene terminated atactic polypropylene was synthesized using organometallic coordinated polymerization as described in US 2009/0318644, resulting in a polymer having a weight average molecular weight of about 90,000 g/mole.

Synthesis of Polyolefin-Epoxide

Polyolefin-epoxide (PO-epoxide) was synthesized by either direct epoxidation of unsaturated polyolefins (Scheme 1) or hydrosilylation with hydrosilane-epoxide species (Scheme 2).

Scheme 1. Direct Epoxidation

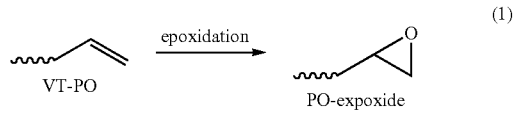

Scheme 2. Hydrosilylation

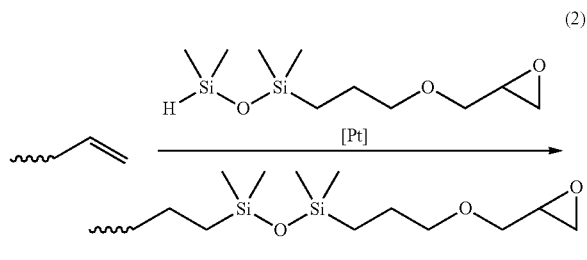

Procedure for direct epoxidation was as follows: under nitrogen protection, VTP was dissolved in xylenes in a 3-neck round bottom flask equipped with a condenser, followed by addition of a molar equivalent amount of meta-chloroperoxybenzoic acid (m-CPBA). The reaction mixture was stirred under room temperature to 90° C. for 2 to 12 hours. It was then cooled down to room temperature and precipitated in methanol. The product was recovered by filtration and dried in 60° C. vacuum oven until the weight was constant.

Procedure for hydrosilylation was as follows: in a nitrogen-filled glove box, VTP was dissolved in toluene, followed by addition of molar equivalent amount of (3-glycidoxypropyl)-1,1,3,3-tetramethyldisiloxane and Karstedt's catalyst (Platinum(0)-1,3-divinyl-1,1,3,3-tetramethyldisiloxane complex", used in ca. 2% solution in xylenes) solution. The reaction mixture was transferred to a fume hood, and stirred overnight at room temperature with slow dry air purging. The reaction mixture was then concentrated and precipitated in isopropanol. The product was recovered by filtration and dried in 60° C. vacuum oven until the weight was constant.

The PO-epoxide was characterized by proton nuclear magnetic resonance ($^1$H NMR). As shown in the representative spectra (FIG. 1), after the reaction, unsaturation disappeared and epoxide appeared.

Synthesis of Polyolefin-Aminosilane and In-Situ Condensation

Multi-branch star polyolefin-aminosilanes were synthesized by epoxide-opening of PO-epoxide with nucleophile-containing silanes, using aminosilanes as an example, and in-situ condensation (Scheme 3), meaning that no separation of the first reaction product took place.

Scheme 3. Epoxide-Opening of PO-Epoxide by Aminosilanes and in-situ Condensation (3)

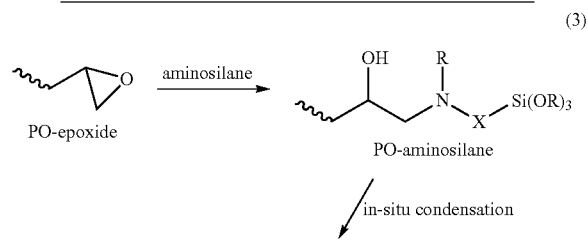

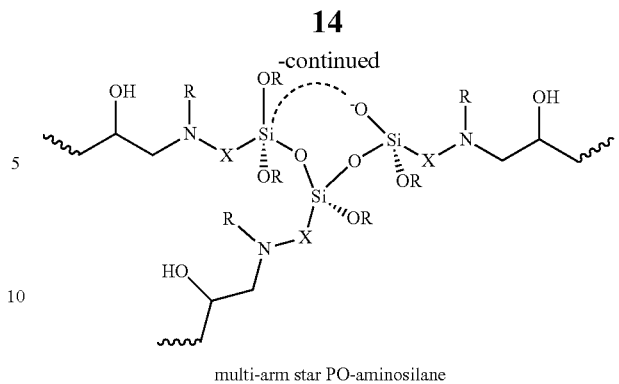

multi-arm star PO-aminosilane

Figure 2:
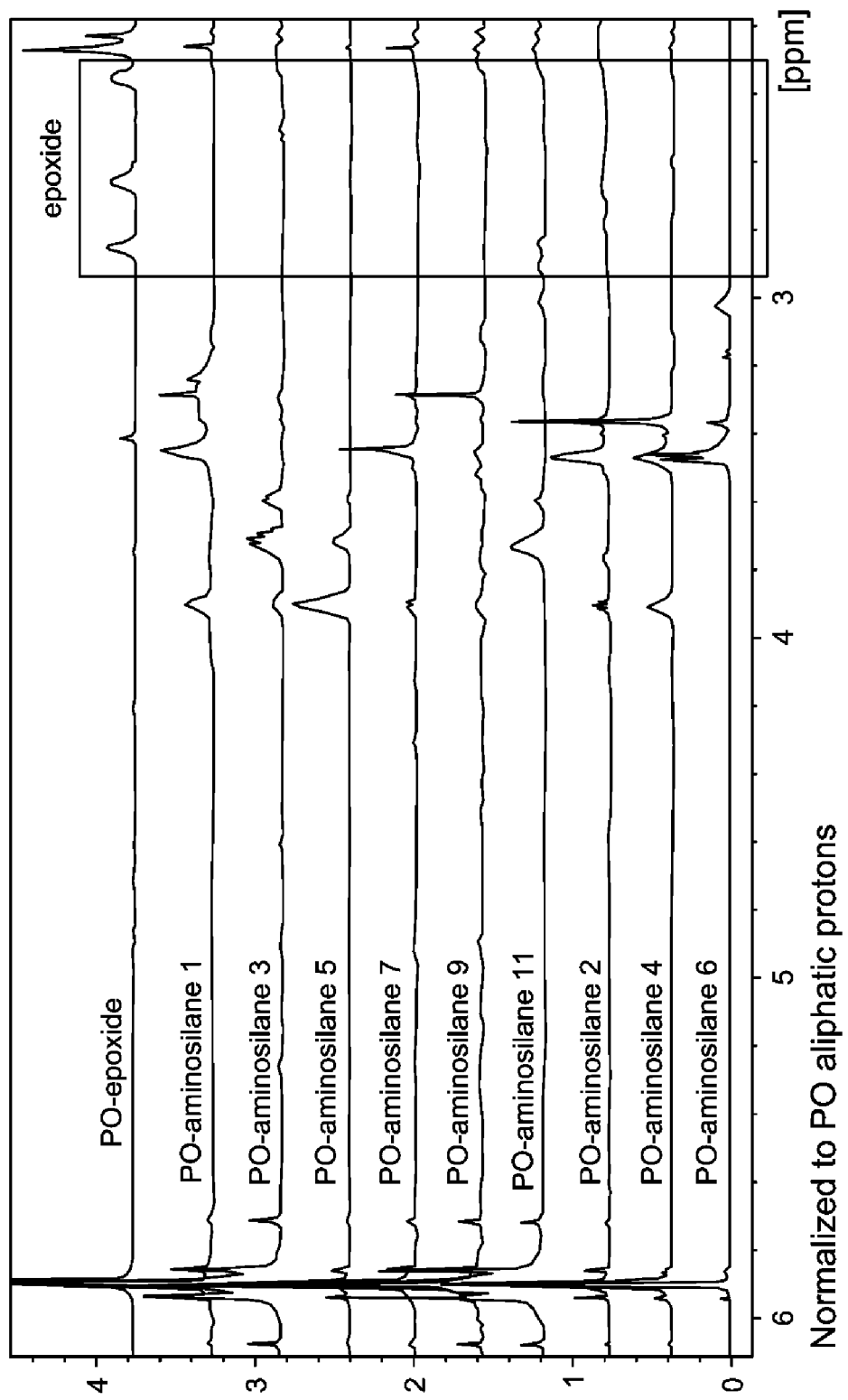
FIG. 2 are overlay of $^1$H NMR Spectra of PO-epoxide (top) and inventive PO-aminosilanes.

All of the 17 PO-aminosilanes incorporating the aminosilanes of Table 1 were experimentally synthesized and they shared the same procedure: Under nitrogen protection, 0.5 mmol PO-epoxide was dissolved in 100 mL anhydrous toluene in a 250 mL 3-neck round bottom flask equipped with a condenser at room temperature. After complete dissolution, 1.5 mmol aminosilane was added into the reaction mixture, followed by addition of 2 mmol magnesium bromide ethyl etherate. The heating temperature was increased to 120° C. and the reaction mixture was run in refluxing toluene overnight. The next day the reaction mixture was cooled down to room temperature and precipitated in 750 mL isopropanol. The product was filtered, washed with fresh isopropanol, and dried in a vacuum oven at 60° C. until constant weight was obtained. The product was stored in a tightly sealed container in a freezer. Table 1 shows the aminosilanes that were used to make the example star structured PO-aminosilanes described herein, with assigned numbers for ease of reference. The star structured PO-aminosilanes were characterized by $^1$H NMR. As shown in the representative spectra (FIG. 2), after the reaction, epoxide disappeared and aminosilane appeared.

TABLE 1

Representative Aminosilanes Investigated

| Ref. No. | Structure |
|---|---|
| 1 | (structure shown) |
| 2 | (structure shown) |

TABLE 1-continued

Representative Aminosilanes Investigated

| Ref. No. | Structure |
|---|---|
| 3 | (EtO)₃Si-CH₂CH₂CH₂-NH-CH₂CH₂CH₂-Si(OEt)₂(propyl) |
| 4 | (MeO)₃Si-CH₂CH₂CH₂-NH-CH₂CH₂-NH-CH₂CH₂-NH₂ |
| 5 | (EtO)₃Si-CH₂CH₂CH₂CH₂-NH₂ |
| 6 | (MeO)₃Si-CH₂CH₂CH₂-NH-C₆H₅ |
| 7 | (MeO)₃Si-CH₂CH₂-C(CH₃)₂-CH₂-NH₂ |
| 8 | (EtO)₃Si-CH₂CH₂CH₂-NH-(CH₂)₆-NH₂ |
| 9 | (MeO)₃Si-CH₂CH₂CH₂-NH₂ |
| 10 | (EtO)₃Si-CH₂-NH-C₆H₅ |

TABLE 1-continued

Representative Aminosilanes Investigated

| Ref. No. | Structure |
|---|---|
| 11 | 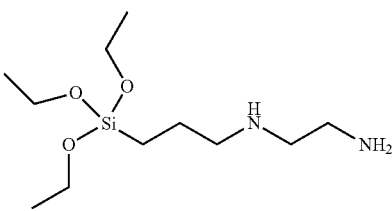 [SMILES: CCO[Si](CCCNCCN)(OCC)OCC] |
| 12 | 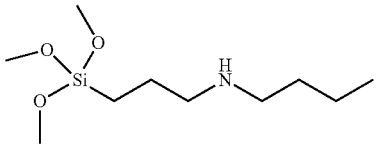 |
| 13 | 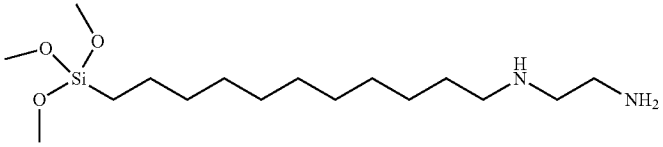 [SMILES: CO[Si](CCCCCCCCCCCNCCN)(OC)OC] |
| 14 | 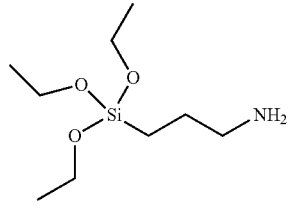 |
| 15 | 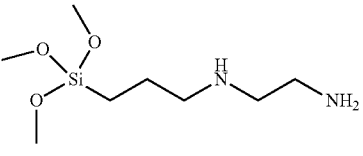 |
| 16 | 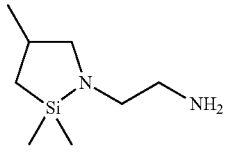 |
| 17 | 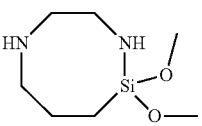 |

Molecular Weight/Complexity and Stability of Polyolefin-Aminosilanes

Figure 3:
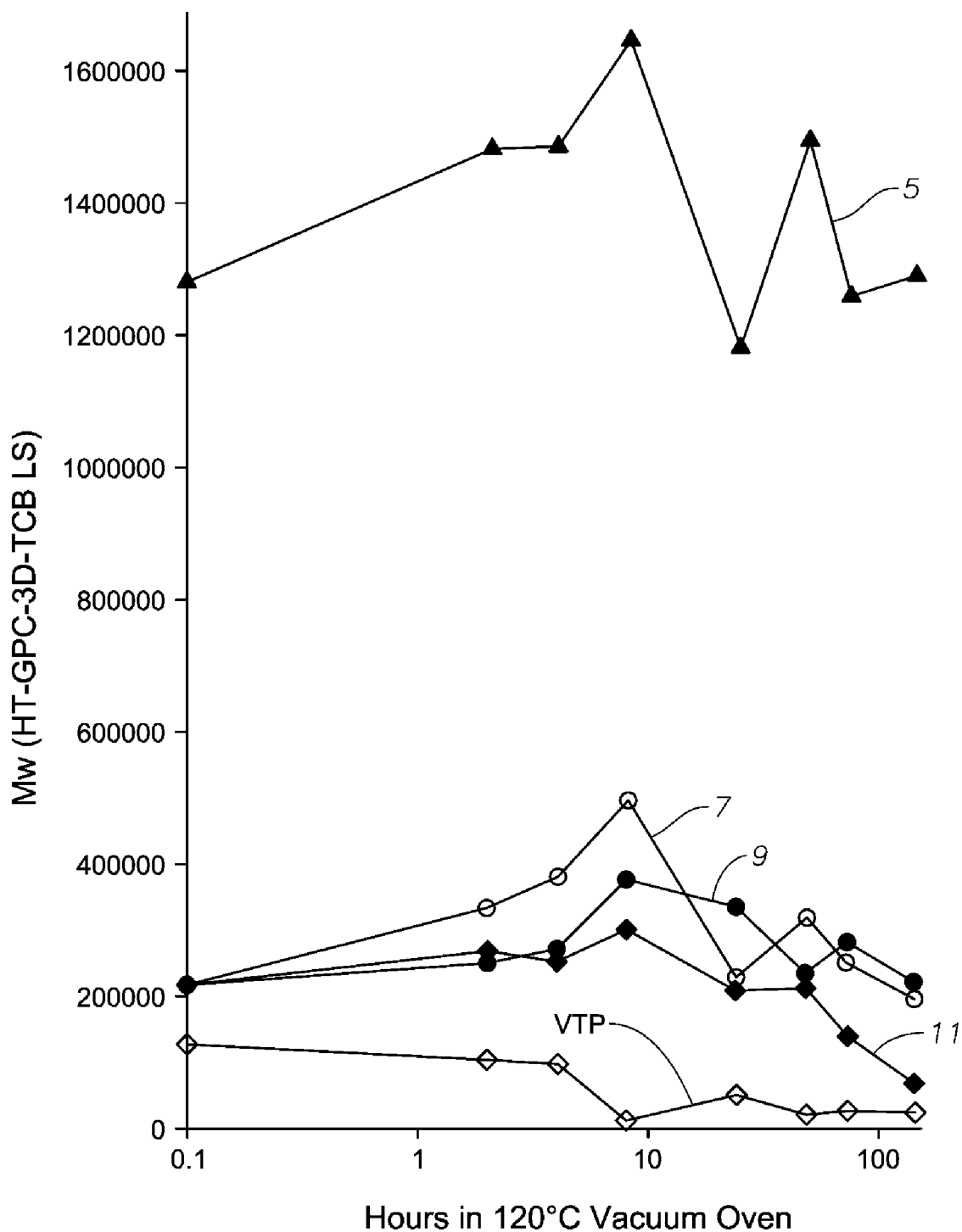
FIG. 3 are plots of Mw of VTP and its counterpart PO-aminosilanes as a function of time at 120° C.

Molecular weight and complexity of polyolefin-aminosilanes were characterized by triple-detector gel permeation chromatography (GPC-3D). Stability study was performed by placing the samples in a vacuum oven at 120° C. Aliquots of samples were taken out from the oven at set time intervals and instantly subjected to GPC-3D analysis. As shown in FIG. 3, functionalization and condensation at various degrees happened at the same time, resulting in higher molecular weights of the functionalized POs. The molecular weights of the functionalized POs depend on the specific aminosilanes attached.

Star structured PO-aminosilanes are relatively more stable to degradation than its VTP precursor. As demonstrated in FIG. 3 and summarized in Table 2, the VTP suffered 77% molecular weight loss over one week in the 120° C. vacuum oven, while the condensed star structured PO-aminosilanes (except for No. 11) showed less or very little molecular weight loss.

TABLE 2

Mw Reduction of VTP and its Star Structured PO-Aminosilanes after One Week in Oven

| Loss of MW: | VTP | PO-aminosilane No. 5 | PO-aminosilane No. 7 | PO-aminosilane No. 9 | PO-aminosilane No. 11 |
|---|---|---|---|---|---|
| % Mw Reduction After 1 week | 77 | −1 | 10 | −4 | 67 |

Figure 4:
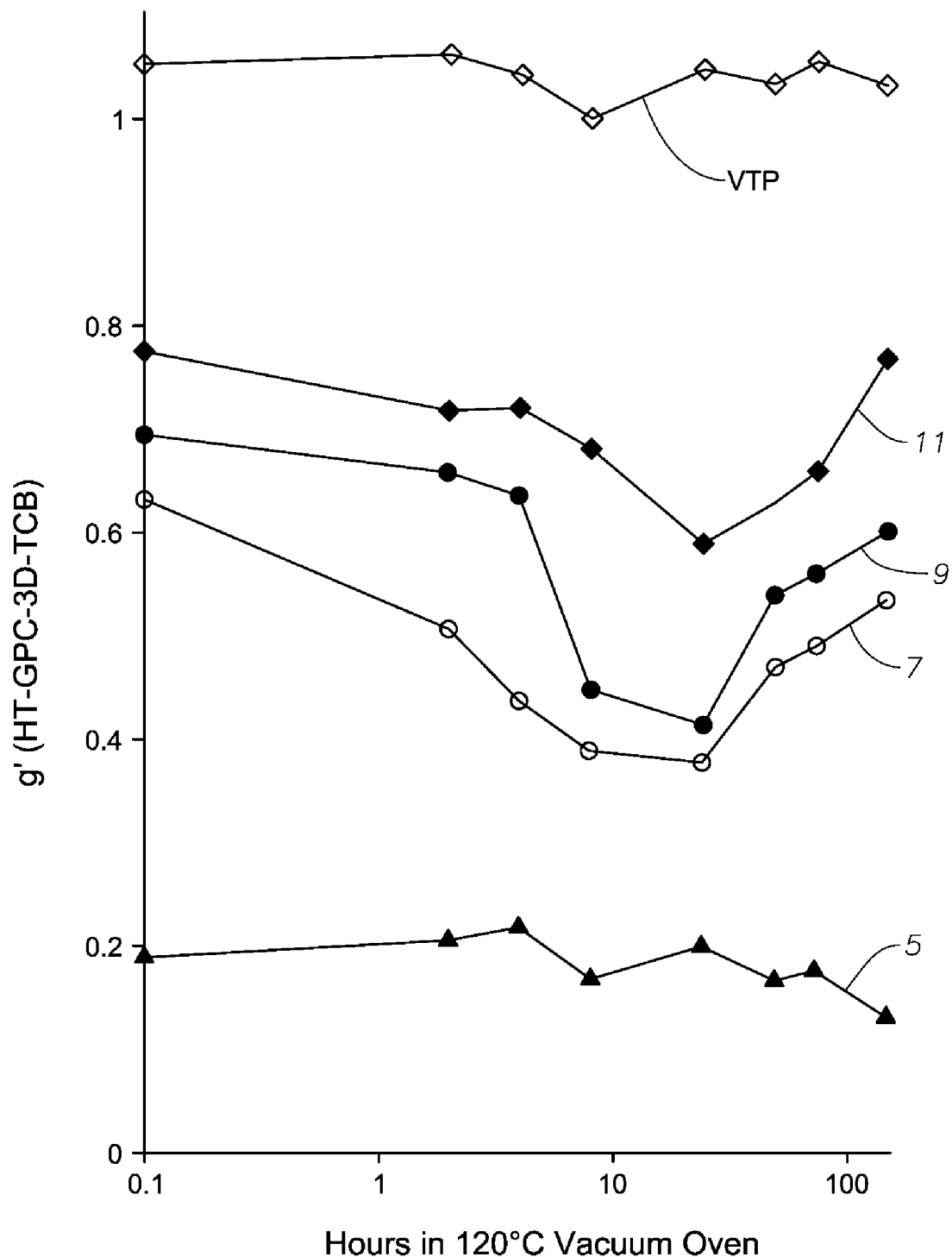
FIG. 4 are plots of g' of VTP and its counterpart PO-aminosilanes as a function of time at 120° C.
Figure 5:
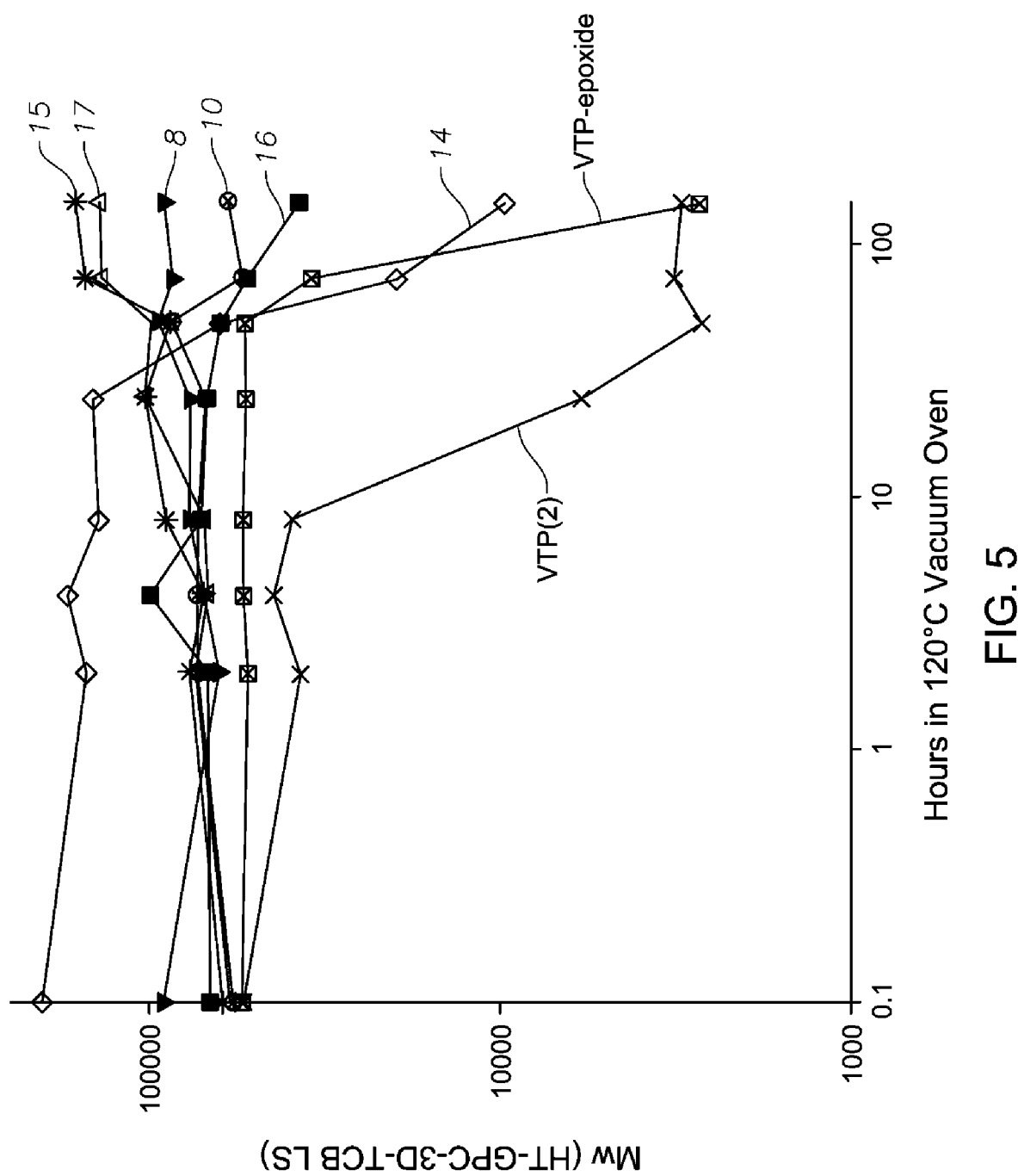
FIG. 5 are plots of Mw of VTP2 and its counterpart PO2-aminosilanes as a function of time at 120° C.

The star structure of the condensed PO-aminosilanes was also stable to further condensation over the long period of time at elevated temperature. As shown in FIG. 3, molecular weights of the PO-aminosilanes didn't increase significantly over the time, indicating no more substantial condensation after the synthesis. Moreover as demonstrated in FIG. 4, the branching index g' is relatively constant, indicating there is neither additional condensation nor dissociation of the complex structure.

A g' value of about 1 (±0.1) corresponds to linear polymer structure. Lower g' value indicates more compact structure of the polymer, in this case, more branches of the star structure. A g' value of about 0.7 (star structured PO-aminosilane No. 11) implies roughly 3-branches, a g' value of about 0.6 (star structured PO-aminosilane No. 9) implies roughly 4-branches, a g' value of about 0.5 (star structured PO-aminosilane No. 7) implies roughly 5-branches, and a g' value of about 0.2 (star structured PO-aminosilane No. 5) implies roughly 15-branches.

The number of branches of the star structured PO-aminosilanes is dependent on the aminosilane structure among other factors such as pH, reaction temperatures, concentrations and molecular weights. A proposed mechanism is shown in Scheme 4. The zwitterion species favor monomeric PO-aminosilane (linear) graft polymers, preventing it from self-condensation and resulting in larger g' values. The non-charged species are prone to self-condensation, resulting in multi-branch stars with smaller g' values. The tendency of forming zwitterions is mainly determined by m, n, R, $R^1$, $R^2$, $R^3$, $R^+$ and $R^5$ (see scheme 4 below) where (m+n) is 0 or any integer, R is typically proton or alkyls, $R^1$ and $R^2$ are typically alkyls or alkoxys, $R^3$ and $R^4$ are independently protons or any groups larger than proton, and $R^5$ is typically proton, alkyls or aminoalkyls.

Scheme 4. Proposed Mechanism of Aminosilane Stabilization

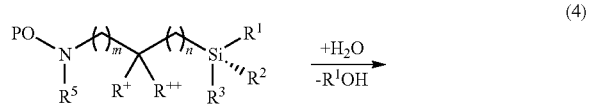

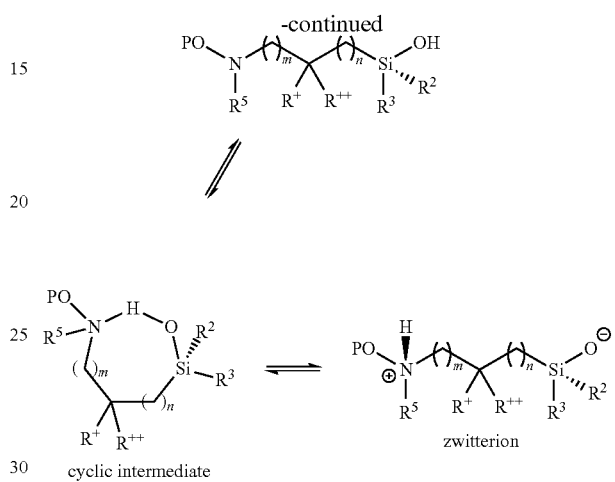

Any factor or combination of factors among m, n, and the R groups that favors the cyclic intermediate (facilitating proton transfer from hydroxyl to amine) is expected to lead to the zwitterion structure which will decrease the branches number. In this regard, an (m+n) of 0, 1, or 2, which corresponds to a 5-membered, 6-membered, or 7-membered cyclic intermediate respectively, favors zwitterion and stabilizes monomer PO-aminosilane. If both $R^+$ and $R^{++}$ are larger than hydrogen (e.g., geminal di-substitution of the "X" group in structure (1)), the cyclic intermediate is also more favored. Additionally, a more electron-donating group $R^5$, such as alkyls and aminoalkyls, makes the amine a better hydrogen bond acceptor, facilitating proton transfer and promoting the zwitterion structure. These effects and their correlations to branches numbers are summarized in Table 3 for some inventive examples. Depending on the desired use of the final start-structured functional polyolefin, the branching number can thus be tailored systematically.

TABLE 3

Correlations between Branches Number and Aminosilane Structure

| Aminosilane | Ref. No. | Branch No. | g' | m + n | $R^+$/$R^{++}$ | $R^5$ | Comment | Cyclic intermediate |
|---|---|---|---|---|---|---|---|---|
|  | 15 | 3 | 0.7 | 2 | H | Amino-alkyl | Both 7-membered ring and e-donating $R^5$ favor zwitterion. Least degree of condensation. |  |

TABLE 3-continued

Correlations between Branches Number and Aminosilane Structure

| Aminosilane | Ref. No. | Branch No. | g' | m + n | R+/R++ | R5 | Comment | Cyclic intermediate |
|---|---|---|---|---|---|---|---|---|
| | 9 | 4 | 0.6 | 2 | H | H | 7-membered ring favors zwitterion. Less degree of condensation. | |
| | 7 | 5 | 0.5 | 3 | CH3 | H | Geminal di-substitution favors zwitterion. Less degree of condensation. | |
| | 5 | 15 | 0.2 | 3 | H | H | No features favor zwitterion. High degree of condensation. | |

Having described the various features of the star-structured functional polyolefins (e.g., star structured PO-aminosilanes), their condensation products, and methods of making both, described here in numbered paragraphs is:

P1. Star-structured functional polyolefins comprising a polyolefin bound at any position along its chain length to at least one nucleophile-containing silane of the following formula:

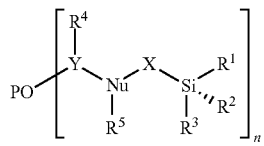

wherein:
Y is a di- or trivalent linker group selected from heteroatoms, C1 to C10 alkylenes, heteroatom substituted C1 to C10 alkylenes, C6 to C20 arylenes, and heteroatom substituted C6 to C20 arylenes; R4 is selected from hydrogen, heteroatoms, and C1 to C10 alkyls;
Nu is a nucleophilic atom or unsaturation group; preferably nitrogen, oxygen, sulfur, or phosphorous;
R5 is selected from hydrogen, and C1 to C10 alkyls, C1 to C10 aminoalkyls, C6 to C20 aryls, C7 to C22 alkylaryls, C7 to C22 aminoaryls, and C7 to C22 arylalkyls;
X is at least a divalent group selected from heteroatoms, C1 to C20 linear alkylenes, a C2 to C22 aminoalkylenes, C2 to C22 divalent ethers, and C2 to C22 or C40 branched alkylene;
silane group wherein each R1, R2, and R3 are independently selected from hydrogen, hydroxide, C1 to C10 alkoxys, C6 to C30 aryloxys, C7 to C30 arylalkyloxys, and C1 to C10 alkylamines, wherein any 2- or more groups can form an aliphatic or aromatic cyclic structure that includes the silicon atom; and
PO is a polyolefin having a Mw of at least 400 g/mole; and "n" is an integer within the range from 1, or 2, or 5 to 10, or 20, or 30;
with the proviso that at least one of R1, R2, and R3 is selected from functional polyolefin moieties having the following structure:

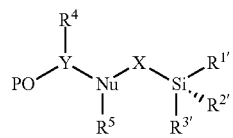

wherein the functional polyolefin moiety is covalently bonded through any one or more of R1', R2', or R3'; and where any other one or more of R1', R2', or R3' is independently selected from hydroxide, C1 to C10 alkoxys, C6 to C30 aryloxys, C7 to C30 arylalkyloxys, and C1 to C10 alkylamines, wherein any 2- or more groups can form an aliphatic or aromatic cyclic structure that includes the silicon atom functional polyolefin moieties.

P2. The star-structured functional polyolefins of numbered paragraph 1, wherein at least one of R1', R2', and R3' is selected from functional polyolefin moieties.

P3. The star-structured functional polyolefins of numbered paragraphs 1 or 2, wherein the polyolefin bound to at least one nucleophile-containing silane anywhere along the polyolefin chain is selected from the group consisting of polybutadienes, polyisoprenes, isobutylene-isoprene copolymer, halogenated isobutylene-isoprene copolymer, isobutylene-p-methylstyrene copolymer, halogenated isobutylene-p-methylstyrene copolymer, ethylene-propylene-diene terpolymers, vinyl/vinylidene-terminated polypropylenes, vinyl/vinylidene-terminated polyethylenes, and vinyl/vinylidene-terminated ethylene-propylene copolymers.

P4. The star-structured functional polyolefins of any one of the previous numbered paragraphs, wherein the weight loss after one week at 120° C. is less than 5, or 10, or 15% of its original Mw.

P5. A highly processable polyolefin blend comprising a polyolefin and within the range from 0.1, or 0.5 wt % to 5, or 10, or 20 wt % of at least one star-structured functional polyolefin, based on the weight of the blend, of any one of the previous numbered paragraphs.

P6. The highly processable polyolefin of numbered paragraph 5, the star-structured functional polyolefins having a branching number (number of PO groups associated in one structure) of at least 3, or within a range from 3, or 8, or 11 to 15, or 20, or 30.

P7. A tire tread formulation comprising the star-structured functional polyolefins of any one of the previous numbered paragraphs comprising at least one elastomer, silica, and the star-structured functional polyolefins.

P8. The tire tread formulation of numbered paragraph 7, the star-structured functional polyolefins having a branching number (number of PO groups associated in one structure) of at least 2, or within a range from 2 to 5, or 10.

P9. A method of forming star-structured functional polyolefins of any one of the previous numbered paragraphs comprising combining:
a) at least one polyolefin comprising at least one nucleophile-reactive group or unsaturation at one or both of the chain ends and/or inside the chain; and
b) at least one nucleophile-containing silane to form a functional polyolefin;
   wherein the at least one site of unsaturation or nucleophile-reactive group forms a covalent bond with the nucleophilic atom of the nucleophile-containing silane;
c) effecting condensation between functional polyolefins to form star-structured functional polyolefins having a branching number of at least 2.

P10. The method of numbered paragraph 9, wherein the polyolefin with at least one nucleophile-reactive group or unsaturation is selected from the group consisting of polybutadienes, polyisoprenes, isobutylene-isoprene copolymer, halogenated isobutylene-isoprene copolymer, isobutylene-p-methylstyrene copolymer, halogenated isobutylene-p-methylstyrene copolymer, ethylene-propylene-diene terpolymers, vinyl/vinylidene-terminated polypropylenes, vinyl/vinylidene-terminated polyethylenes, and vinyl/vinylidene-terminated ethylene-propylene copolymers.

P11. The method of any one of numbered paragraphs 9-10, wherein the polyolefin comprising at least one nucleophile-reactive group or unsaturation is a vinyl/vinylidene terminated polyolefin.

P12. The method of any one of numbered paragraphs 9-11, wherein all reaction steps occur together (in one system, container, vessel, etc.).

P13. The method of any one of numbered paragraphs 9-12, having a branching number within the range from 2, or 3, or 4, or 6, or 8 to 15, or 20, or 30.

P14. The method of any one of numbered paragraphs 9-13, wherein the nucleophile-containing silane is selected from compounds having the following structure:

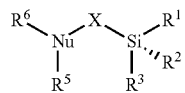

wherein each R1, R2, and R3 are independently selected from hydrogen, hydroxide, C1 to C10 alkoxys, C6 to C30 aryloxys, C7 to C30 arylalkyloxys, and C1 to C10 alkylamines, wherein any 2- or more groups can form an aliphatic or aromatic cyclic structure with that includes the silicon atom;

Nu is a nucleophilic atom or unsaturation group; preferably nitrogen, oxygen, sulfur, or phosphorous;

X is at least a divalent group selected from heteroatoms, C1 to C20 linear alkylene, a C2 to C22 aminoalkylene, C2 to C22 divalent ether, and C2 to C22 or C40 branched alkylene;

R5 and R6 are independently selected from hydrogen, C1 to C10 alkyls, C1 to C10 aminoalkyls, C6 to C20 aryls, C7 to C22 alkylaryls, C7 to C22 aminoaryls, and C7 to C22 arylalkyls; and silane group wherein any one of R1, R2 or R3 may form a 5 to 10 membered alkylene or aminoalkylene ring with Nu.

P15. The method of any one of numbered paragraphs 9-14, wherein the combining occurs under hydroaminoalkylation conditions.

P16. The method of any one of numbered paragraphs 9-15, wherein the polyolefin with at least one unsaturation is treated first, prior to combining with the at least one aminosilane, by one or more of direct epoxidation, and/or hydrosilylation.

P17. The method of any one of numbered paragraphs 9-16, wherein as the tendency to form an aminosilane zwitterion increase, the branching number decreases.

P18. The method of any one of numbered paragraphs 9-17, further comprising combining the star-structured functional polyolefins with at least one elastomer and silica to form a tire tread composition.

P19. A method of tailoring the branching number of a silane-functionalized polyolefin of any one of the previous numbered paragraphs, wherein the at least one nucleophile-containing silane is chosen to favor the zwitterion or cyclic intermediate by varying the reaction temperature, the pH of the medium, the identity of "X", R5, or any combination thereof; more preferably, comprising choosing the structure of the nucleophile-containing silane and/or the conditions under which the reaction is performed, thus effecting the formation of a zwitterion or cyclic intermediate and effecting the branching number.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. Star-structured functional polyolefins comprising:
a polyolefin bound at any position along its chain length to at least one nucleophile-containing silane of the following formula:

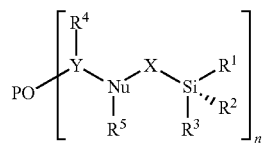

wherein:
Y is a di- or trivalent linker group selected from heteroatoms, C1 to C10 alkylenes, heteroatom substituted C1 to C10 alkylenes, C6 to C20 arylenes, and heteroatom substituted C6 to C20 arylenes;
R4 is selected from hydrogen, heteroatoms, and C1 to C10 alkyls;
Nu is a nucleophilic atom;

R5 is selected from hydrogen, and C1 to C10 alkyls, C1 to C10 aminoalkyls, C6 to C20 aryls, C7 to C22 alkylaryls, $C_7$ to $C_{22}$ aminoaryls, and C7 to C22 arylalkyls;

X is at least a divalent group selected from the group consisting of C4 to C20 linear alkylenes, C4 to C22 divalent ethers, and C4 to C22 branched alkylene;

the silane group comprises a silicon atom bonded to each of an R1, an R2, and an R3, wherein each R1, R2, and R3 are independently selected from hydrogen, hydroxide, C1 to C10 alkoxys, C6 to C30 aryloxys, C7 to C30 arylalkyloxys, and C1 to C10 alkylamines, wherein any 2- or more groups can form an aliphatic or aromatic cyclic structure that includes the silicon atom; and PO is a polyolefin having a Mw of at least 400 g/mole; and "n" is an integer within the range from 1 to 30;

with the proviso that at least two of R1, R2, and R3 is selected from functional polyolefin moieties having the following structure:

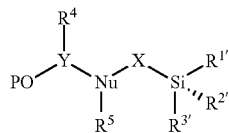

wherein the functional polyolefin moiety is covalently bonded to the silane group via any one or more of R1', R2', or R3'; and where any other one or more of R1', R2', or R3' is independently selected from hydroxide, C1 to C10 alkoxys, C6 to C30 aryloxys, C7 to C30 arylalkyloxys, and C1 to C10 alkylamines, wherein any 2- or more groups can form an aliphatic or aromatic cyclic structure that includes the silicon atom functional polyolefin moieties;

wherein the star-structured functional polyolefins have a branching number within the range of 3 to 30.

2. The star-structured functional polyolefins of claim 1, wherein R4 is a hydroxyl group and Nu is nitrogen.

3. The star-structured functional polyolefins of claim 1, wherein at least one of R1', R2', and R3' is selected from functional polyolefin moieties.

4. The star-structured functional polyolefins of claim 1, wherein the polyolefin bound to at least one nucleophile-containing silane anywhere along the polyolefin chain is selected from the group consisting of polybutadienes, polyisoprenes, isobutylene-isoprene copolymer, halogenated isobutylene-isoprene copolymer, isobutylene-p-methylstyrene copolymer, halogenated isobutylene-p-methylstyrene copolymer, ethylene-propylene-diene terpolymers, vinyl/vinylidene-terminated polypropylenes, vinyl/vinylidene-terminated polyethylenes, and vinyl/vinylidene-terminated ethylene-propylene copolymers.

5. The star-structured functional polyolefins of claim 1, wherein X is a C4 to C20 linear alkylene, or a C4 to C20 branched alkylene.

6. The star-structured functional polyolefins of claim 1, wherein the weight loss after one week at 120° C. is less than 5% of its original Mw.

7. A polyolefin blend comprising a polyolefin and within the range from 0.1 wt % to 20 wt % of at least one star-structured functional polyolefin, based on the weight of the blend, of claim 1.

8. A tire tread formulation comprising the star-structured functional polyolefins of claim 1, at least one elastomer and silica.

9. A method of forming star-structured functional polyolefins comprising combining:
a) at least one polyolefin comprising at least one unsaturation at one or both of the chain ends and/or inside the chain; and
b) at least one nucleophile-containing silane to form a functional polyolefin, wherein the nucleophile-containing silane comprises a nucleophilic atom selected from the group consisting of nitrogen, oxygen, sulfur, or phosphorous;
wherein the at least one site of unsaturation forms a covalent bond with the nucleophilic atom of the nucleophile-containing silane;
c) effecting condensation between at least three functional polyolefins to form star-structured functional polyolefins having a branching number within the range of 3 to 30.

10. The method of claim 9, wherein the polyolefin with at least one unsaturation is selected from the group consisting of polybutadienes, polyisoprenes, isobutylene-isoprene copolymer, halogenated isobutylene-isoprene copolymer, isobutylene-p-methylstyrene copolymer, halogenated isobutylene-p-methylstyrene copolymer, ethylene-propylene-diene terpolymers, vinyl/vinylidene-terminated polypropylenes, vinyl/vinylidene-terminated polyethylenes, and vinyl/vinylidene-terminated ethylene-propylene copolymers.

11. The method of claim 9, wherein condensation is effected by refluxing the functionalized polyolefin in solvent for at least 2 hours.

12. The method of claim 9, wherein the polyolefin comprising at least one unsaturation is a vinyl/vinylidene terminated polyolefin.

13. The method of claim 12, wherein all reaction steps occur together.

14. The method of claim 12, having a branching number within the range from 5 to 30.

15. The method of claim 9, wherein the nucleophile-containing silane is selected from compounds having the following structure:

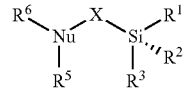

wherein each R1, R2, and R3 are independently selected from the group consisting of hydrogen, hydroxide, C1 to C10 alkoxys, C6 to C30 aryloxys, C7 to C30 arylalkyloxys, and C1 to C10 alkylamines, wherein any 2- or more groups can form an aliphatic or aromatic cyclic structure with that includes the silicon atom;

Nu is the nucleophilic atom;

X is at least a divalent group selected from the group consisting of C4 to C20 linear alkylene, C4 to C22 divalent ether, and C4 to C22 or C40 branched alkylene;

R5 and R6 are independently selected from the group consisting of hydrogen, C1 to C10 alkyls, C1 to C10 aminoalkyls, C6 to C20 aryls, C7 to C22 alkylaryls, C7 to C22 aminoaryls, and C7 to C22 arylalkyls; and silane group wherein any one of R1, R2 or R3 may form a 5 to 10 membered alkylene or aminoalkylene ring with Nu.

16. The method of claim 9, wherein the combining occurs under hydroaminoalkylation conditions.

17. The method of claim 9, further comprising treating the polyolefin with at least one nucleophile-reactive group by direct epoxidation and/or hydrosilylation prior to combining said polyolefin with the least one nucleophile-containing silane.

18. The method of claim 9, further comprising combining the star-structured functional polyolefins with at least one elastomer and silica to form a tire tread composition.

19. The method of claim 9, wherein the weight loss of the star-structured functional polyolefins after one week at 120° C. is less than 5% of its original Mw.

20. A method of tailoring the branching number of a silane-functionalized polyolefin of claim 9, comprising choosing the structure of the nucleophile-containing silane and/or the conditions under which the reaction is performed.

21. The star-structured functional polyolefins of claim 1, wherein the nucleophilic atom is nitrogen.

22. The method of claim 9, wherein the nucleophilic atom is nitrogen.

23. The star-structured functional polyolefins of claim 1, wherein the branching number is within the range from 3 to 15.

24. The star-structured functional polyolefins of claim 1, wherein n is within the range from 1 to 3.

* * * * *